3,296,335
PROCESS FOR PROVIDING ELECTRICALLY IN-
SULATED CONDUCTORS AND COATING COM-
POSITION FOR SAME
Franz Blaschke, Witten-Ruhr, Germany, assignor to
Chemische Werke Witten G.m.b.H., Witten-Ruhr,
Germany
No Drawing. Filed Oct. 30, 1962, Ser. No. 234,206
Claims priority, application Germany, Nov. 10, 1961,
C 25,474
17 Claims. (Cl. 260—860)

The present invention is directed to the production of electrically insulated conductors, and more particularly, to a new and improved coating agent for electrical conductors.

Insulation of metallic electric conductors with aromatic polyesters is known. Suitable polyesters are linear hydroxypolyesters, which are made by polycondensation of terephthalic acid, in the form of a derivative of this acid with a radical disposed on the carbonyl group or groups thereof, which may be readily replaced by the alkoxy group of an alcohol, and glycols of the series $$HO(CH_2)_nOH$$

where $n$ is an integral number from 1 to 10, as well as of terephthalic acid, and, respectively, derivatives of this acid, and an aliphatic dicarboxylic acid, such as sebacic acid, and a glycol of the aforementioned series.

Additionally, such resinous hydroxypolyesters which contain hydroxy groups not only on the ends of the molecular chain but also in the molecular chain, which latter are designated hereinafter as chain-positioned hydroxyl groups, are polycondensed from the following starting materials: (1) tere- and/or isophthalic acid or derivatives thereof with a radical disposed on the carbonyl group or groups thereof, which may easily be replaced by the alkoxy group of an alcohol, (2) ethylene glycol and/or higher glycols, and (3) a saturated aliphatic polyhydric alcohol with at least 3 hydroxyl groups.

The aforementioned linear hydroxypolyesters, such as polyethylene glycol terephthalate, have disadvantages when used as wire lacquers for the insulation of electric conductors. Due to their being difficultly soluble in most conventional solvents, they cannot be made into high percent solutions and thus have to be eliminated for this reason alone from practical use as a wire lacquer raw material. The linear hydroxypolyesters modified with sebacic acid may be dissolved to form high percent lacquers in suitable solvents only at such high proportions of this aliphatic dicarboxylic acid that the thermal and mechanical properties of the films from these polycondensate solutions are not satisfactory.

While the further-mentioned hydroxypolyesters from an aromatic dicarboxylic acid or derivatives thereof, a glycol and a polyalcohol containing more than 2 hydroxyl groups render it possible to prepare relatively high percent wire lacquer solutions, the insulating films therefrom are unsatisfactory in view of the disadvantageous mechanical properties thereof, such as heat-shock behavior, hardness and abrasion resistance, as well as solvent stability.

It has now been found that electrically insulated conductors show particularly good mechanical and electrical properties with regard to the insulating films surrounding them, when they are prepared by the use of coating agents from (A) a linear hydroxypolyester from terephthalic acid, if desired, in mixture with isophthalic acid, and ethylene glycol having a viscosity number higher than 0.5;

(B) a polyester containing end and chain-positioned hydroxyl groups prepared from tere- and/or isophthalic acid, or derivatives thereof with one radical disposed on the carbonyl group or groups which may be readily replaced by the alkoxy group of an alcohol, preferably the lower alkyl esters or the acid chlorides thereof, ethylene glycol, and a saturated polyalcohol containing at least 3 hydroxyl groups; and, if desired, (C) organic solvents.

Hardening and cross-linking agents, such as zinc and lead octoate, tetrabutyl titanate, etc., may be added, if desired, to the polyester mixtures to be used for the preparation of the electrically insulated conductors according to the present invention.

The insulated electric conductors prepared from the polyester mixtures employed according to the present invention have far higher values with regard to the heat-shock properties, abrasion resistance, as well as the solvent stability thereof, than the heretofore known terephthalate resinous films.

The mechanical and electrical properties of the polyester films used as insulating material for the electric conductors are strongly dependent upon the molecular weight of the linear hydroxypolyester component used. An addition of a linear hydroxypolyester having an insufficiently high molecular weight to a terephthalate resin with terminal- and center-positioned hydroxyl groups reveals practically no influence on the properties of the films made from the latter resin.

For example, a homologous series of linear, ethylene glycol-containing hydroxypolyesters was produced on the basis of terephthalic acid and isophthalic acid in a molar ratio of 1:1 with different molecular weights, expressed by the viscosity number $[Z\eta]_{c=1}$, and added in each case to the same terephthalate resin with terminal- and chain-positioned hydroxyl groups derived from ethylene glycol and glycerine.

For the determination of the viscosity number $[Z\eta]_{c=1}$, 1% by weight solutions of the polymers in a phenol-tetrachloroethane mixture are used in a weight ratio of 60:40 at 25° C. From the flow periods of the solution ($t_1$) and the solvent ($t_0$), for example, through an Ostwald Viscosimeter, the specific viscosity is calculated according to the following formula $$\eta sp = \frac{t_1}{t_0} - 1$$

The specific viscosity reduced to the concentration $c=1$ g./100 cc. will be designated hereinafter as viscosity number $[Z\eta]_{c=1}$.

The polyester mixtures from the linear hydroxypolyesters having different molecular weights and the respectively added, similarly composed terephthalate resin containing terminal- and chain-positioned hydroxyl groups show, on copper wires, after baking under comparable conditions, with tetrabutyl titanate as cross-linking agent, a distinct improvement of the heat-shock and abrasion properties only if and when the viscosity number of the linear polyester is higher than 0.5. Those polyesters having a lower molecular weight corresponding thereto do not bring about an improvement in these properties of the films.

The mixing ratio of the linear hydroxypolyester (A) and of the hydroxypolyester (B) also containing chain-positioned hydroxyl groups is in the weight ratio of 5–60 parts A:95–40 parts B.

The molar ratio between the tere- and the isophthalic acid which is suitable for the preparation of such high molecular weight linear hydroxypolyesters (A) may be varied within wide limits. Preferably, a ratio of 70–50 parts by weight of terephthalic acid and 30–50 parts by weight of isophthalic acid serves for preparing hydroxypolyesters which, in the combination according to the present invention, lead to particularly favorable lacquer systems which have excellent storage stability.

The production or preparation of the linear hydroxypolyesters (A) takes place according to known processes, for example, by interchange of ester radicals (alcoholysis) of the mono- or dialkylesters of tere- and, if necessary, isophthalic acid, to which free tere- and isophthalic acid may be added, if desired, and subsequent polycondensation, if necessary, with the aid of catalysts such as lead oxide, antimony oxide, cadmium acetate, zinc acetate, butyl titanate, etc., and, respectively, mixtures thereof, at temperatures between 240 and 300° C. and a vacuum of up to 0.01 Torr.

The end- and chain-positioned hydroxypolyesters (B) may also be obtained according to known processes, for example, by interchange of ester radicals and polycondensation of 45% by weight of dimethyl terephthalate, 33% by weight of ethylene glycol, and 22% by weight of glycerine. Instead of the dimethyl terephthalate, also other di- or monoalkylesters of tere- and/or isophthalic acid, or free tere- and/or isophthalic acid may be used. Instead of, or in addition to glycerine, other saturated polyalcohols, containing at least 3 hydroxyl groups, or mixtures thereof with each other may be used. Such polyalcohols include, for example, 1,1,1-trimethylolpropane; 1,1,1-trimethylolethane, pentaerythritol, sorbitol, mannitol, diglycerine, dipentaerythritol, etc.

In the preparation of the hydroxypolyesters which also contain chain-positioned hydroxyl groups, the reactants are brought to the suitable transesterification temperature of between about 180 and 220° C. with the prior addition of an alkyl phthalate and, if necessary, with the addition of a transesterification catalyst such as lead oxide, zinc acetate, etc. The reactants are condensed up to a viscosity number of 0.08–0.25, after the more or less complete removal of the alkanol and, if necessary, with the addition of a polycondensation catalyst such as antimony oxide, butyl titanate, etc., at temperatures of between about 220 and 280° C., if necessary, using a vacuum of 50 Torr maximum.

The polyester resin mixtures according to the present invention are easily soluble in phenol, cresols, xylenols, methylglycol acetate, diacetone alcohol, etc., and, respectively, other such mixtures. The use of diluting solvent agents, such as solvent naphtha, is also possible with the coating agent of the present invention. With the use of such solvents in preparing wire lacquers, a solution containing from 20 to 50% by weight, preferably 30–40% by weight, of solid compounds is customarily used, depending upon the thickness of the electric conductor to be insulated.

In order to accelerate hardening of the lacquer film, the metal salts of the organic acids of Zn, Ce, Zr, Sb, Mg, Na, Mn, Co, or Pb compounds or the alcoholates of Na, Mg or Al or Ti-, Al-, Si- or of B-compounds, particularly an organic titanium acid ester such as monomeric tetrabutyl titanate or the polymerization products thereof, may be employed. Tetrabutyl titanate is employed in amounts of from 0.5 to 8% by weight, based on the weight of the solid constituents, preferably 1–2% by weight.

When making the insulated electric conductors according to the present invention, the electric conductor is repeatedly drawn through one of the above-mentioned resinous solutions by means of a conventional vertical or horizontal wire lacquer machine at such speed, and exposed to such temperature, that an optimum hardening of the film will take place. The electric conductor is, for example, passed through a hardening zone maintained at a temperature of between approximately 380 and 470° C. at a rate of about 4 to 10 meters/minute with a stove length of approximately 3 meters.

It is an object of the present invention, therefore, to provide a new and improved composition for use as a film in coating electric conductors.

This and other objects will become apparent from the following description wherein the examples serve to illustrate the invention without, however, limiting the same.

*Example 1*

A linear hydroxypolyester (A) is prepared by heating a mixture of:

| | mol |
|---|---|
| Dimethyl terephthalate | 1.0 |
| Dimethyl isophthalate | 1.0 |
| Ethylene glycol | 4.0 |
| Zinc acetate | 0.0005 | under nitrogen to 160–195° C. in a V-4-A stirring vessel until cleavage of the methanol is completed. Subsequently, the temperature is increased to 280° C., while continuously stirring and gradually decreasing the pressure to 0.3 Torr, and the condensation is conducted for such a length of time until a viscosity number of 0.83 has been reached.

A polyester (B) containing terminal- and chain-positioned hydroxyl groups is obtained by heating:

| | mol |
|---|---|
| Dimethyl terephthalate | 2.2 |
| Glycerine | 1.0 |
| Ethylene glycol | 1.5 |
| Lead oxide | 0.00037 | under nitrogen to a temperature of from 180–190° C. in a V-4-A stirring vessel until the cleavage of methanol is completed. The temperature is gradually increased to 250° C. and the polycondensation discontinued after a viscosity number of 0.15 has been reached. The passage of time of a cresol solution thereof, containing 25% of solid compounds of such a branched polyester resin, is 90–100 sec. at 20° C. in the DIN 4 mm. beaker.

For lacquering copper wire of 0.6 mm. thickness, a composition I, formed as indicated below, was used:

| | Parts by weight |
|---|---|
| Polyester B | 35.0 |
| Polyester A | 9.0 |
| Polymeric butyl titanite | 0.7 | are dissolved in

| | Parts by weight |
|---|---|
| Cresol | 62.0 |
| Solvent naphtha | 23.5 |

The wire was drawn at a speed of 4.5 m. per minute and the baking took place at 450° C. on a conventional horizontal lacquer machine with a stove length of 3 m. After 6 passages, the mechanical properties of the lacquer film made from the lacquer solution, identified as I, were measured.

As a comparison, a lacquer wire film was formed on a conventional basis, and its mechanical properties were measured. The conventional film is identified as Test. The polyester film Test containing only conventional terminal- and chain-positioned hydroxyl groups was made from a mixture of:

| | Parts by weight |
|---|---|
| Polyester B | 35.0 |
| Polymeric butyl titanate | 0.7 |
| Cresol | 41.0 |
| Solvent naptha | 23.3 |

|   |   | Lacquer Film from Lacquer | |
|---|---|---|---|
|   |   | Test | I |
| (1) | Lacquer Coating | 50μ | 50μ. |
| (2) | Starting Hardness according to DIN 46 453 | 3-4H | 3H. |
| (3) | Hardness after 30 minutes solvent storage at 50° C. according to DIN 46 453: |   |   |
|   | (a) Spirit | 2-3H | 2-3H. |
|   | (b) Benzene | 2-3H | H. |
|   | (c) Toluene | 3-4H | 2H. |
|   | (d) Trichloroethylene | B-H | 2B. |
|   | (e) Butyl acetate | 3-4H | 2H. |
|   | (f) Water | 2-3H | 2H. |
| (4) | Elongation at break coil. The lacquered wire stretched to break is wound around a 0.4 mm. mandrel. | Completely fissured | 3 cracks. |
| (5) | Heat aging of the wound coil at 200° C. according to DIN 46 453: |   |   |
|   | 24 hrs | 25% | 50%. |
|   | 48 hrs | 15% | 50%. |
| (6) | Heat shock stability of the wound coil according to DIN 46 453, 15 min. at 180° C.: |   |   |
|   | 35% elongation | 20 fissures split | 6 fissures. |
|   | 50% elongation | Cracks | Slightly peeled off. |
| (7) | Heat pressure resistance according to DIN 46 453 | 310° C | 285° C. |
| (8) | Abrasion resistance according to NEMA: MW-55-1955. | 48 | 70. |

The coils referred to in the comparison hereinabove and in Examples II and III are prepared according to the NEMA approved standards as set forth in NEMA Standards Publication No. MW 5-1961, February 1961.

Example II

A 0.6 mm. thick copper wire was lacquered with a solution prepared from:

| | Parts by weight |
|---|---|
| Polyester B according to Example I | 35.0 |
| Polyester A according to Example I | 15.0 |
| Polymeric butyl titanate | 4.0 |
| Cresol | 76.0 |
| Solvent naphtha | 23.5 |

At a drawing speed of 4.5 m. per minute, baking took place at 450° C. on conventional horizontal lacquer machine with a stove length of 3 m. After 6 passages, the following values of the lacquer film were measured in a comparison with the conventional lacquer Test produced with the usual polyester basis, i.e., with the above-described resin B alone.

|   |   | Lacquer Film from Lacquer | |
|---|---|---|---|
|   |   | Test | II |
| (1) | Lacquer Coating | 50μ | 50μ. |
| (2) | Starting Hardness according to DIN 46 453 | 3-4H | 4H. |
| (3) | Hardness after 30 minutes solvent storage at 50° C. according to DIN 46 453: |   |   |
|   | (a) Spirit | 2-3H | 4H. |
|   | (b) Benzene | 2-3H | 2-3H. |
|   | (c) Toluene | 3-4H | 3-4H. |
|   | (d) Trichloroethylene | B-H | 3B. |
|   | (e) Butyl acetate | 3-4H | 4H. |
|   | (f) Water | 2-3H | 3-4H. |
| (4) | Elongation at break coil. The lacquered wire stretched to break is wound around a 0.4 mm. mandrel. | Completed fissured | Good. |
| (5) | Heat aging of the wound coil at 200° C. according to DIN 46 453: |   |   |
|   | 35% elongation (coil wound around double mandrel). | 20 fissures | Do. |
|   | 50% elongation (coil wound around single mandrel). | Split cracks | Some cracks at point. |
| (6) | Heat pressure resistance according to DIN 46 453 | 310° C | 310° C. |
| (7) | Abrasion resistance according to NEMA: MW-55-1955. | 48 | 90. |

Example III

A 0.6 mm. thick copper wire was coated with a solution composed as follows:

| | Parts by weight |
|---|---|
| Polyester B according to Example I | 35.0 |
| Polyester A, having the viscosity number 0.45 | 15.0 |
| Polymeric butyl titanate | 0.7 |
| Cresol | 76.0 |
| Solvent naphtha | 23.5 |

At a drawing speed of 4.5 m. per minute, baking took place at 450° C. in a conventional horizontal lacquer machine with a stove length of 3 m. After 6 passages, the following values of the lacquer film were measured as compared to a lacquer prepared with the usual polyester B basis.

| | | Lacquer Film from Lacquer | |
|---|---|---|---|
| | | Test | III |
| (1) | Lacquer Coating | 50 μ | 50 μ. |
| (2) | Starting Hardness according to DIN 46 453 | 3-4H | 3-4H. |
| (3) | Hardness after 30 minutes solvent storage at 50° C. according to DIN 46 453: | | |
| | (a) Spirit | 2-3H | 3H. |
| | (b) Benzene | 2-3H | 2H. |
| | (c) Toluene | 3-4H | 3-4H. |
| | (d) Trichloroethylene | B-H | 2B. |
| | (e) Butyl acetate | 3-4H | 3H. |
| | (f) Water | 2-3H | 3H. |
| (4) | Elongation at break coil. The lacquered wire stretched to break is wound around a 0.4 mm. mandrel. | Completely fissured | Completely fissured. |
| (5) | Heat aging of the wound coil according to DIN 46 453 at 200° C.: | | |
| | 24 hrs | 25% | 15%. |
| | 48 hrs | 15% | 15%. |
| (6) | Heat shock resistance of the wound coil according to DIN 46 453, 15 min. at 180° C.: | | |
| | 35% elongation (coil wound around double mandrel) | 20 cracks | 34 cracks. |
| | 50% elongation (coil wound around single mandrel) | Split cracks | Completely peeled off. |
| (7) | Heat pressure resistance according to DIN 46 453 | 310° C | 290° C. |
| (8) | Abrasion resistance according to NEMA: MW 55-1955. | 48 | 70. |

Although the invention has been illustrated and described with reference to the preferred mode of operation and the above examples, it is understood that it is no way limited thereby, but is capable of modifications within the scope of the appended claims.

I claim:

1. A method of manufacturing electrically insulated conductors by coating the same with an insulating composition, comprising passing the electric conductor through a bath of a coating composition comprising (A) approximately 5 to 60 parts by weight of a linear hydroxypolyester of an acid selected from the group consisting of terephthalic acid and mixtures thereof with isophthalic acid and ethylene glycol, said linear hydroxypolyester having a viscosity number above about 0.5, and (B) approximately 95 to 40 parts by weight of a polyester of a compound selected from the group consisting of terephthalic acid, isophthalic acid, mixtures of terephthalic and isophthalic acids, and derivatives of isophthalic and terephthalic acids having a radical disposed on at least one of the carbonyl groups which is easily replaceable by the alkoxy group of an alcohol, ethylene glycol and a saturated poly-alcohol containing at least 3 hydroxyl groups, said polyester containing terminal- and chain-positioned hydoxyl groups, and subsequently passing the coated conductor through a hardening zone of approximately 3 m. in length maintained at a temperature of at least 380° C. at a rate of approximately 4 to 10 m./minute.

2. A method of manufacturing electrically insulated conductors as defined in claim 1, wherein said coating composition further includes a hardening agent selected from the group consisting of the organic titanates, said hardening agent being used in quantities of from 0.5 to 8% by weight, base on the weight of the solid constituents of the composition.

3. A method of manufacturing electrically insulated conductors as defined in claim 1, wherein said coating comopsition includes an organic solvent.

4. A coating composition for use in insulating electric conductors comprising (A) approximately 5 to 60 parts by weight of a linear hydroxypolyester of an acid selected from the group consisting of terephthalic acid and mixtures thereof with isophthalic acid and ethylene glycol, said linear hydroxypolyester having a viscosity number above approximately 0.5, and (B) approximately 95 to 40 parts by weight of a polyester of a compound selected from the group consisting of terephthalic acid, isophthalic acid, mixtures of terephthalic and isophthalic acids, and derivatives of isophthalic and terephthalic acids having a radical disposed on at least one of the carbonyl groups which is easily replaceable by the alkoxy group of an alcohol, ethylene glycol and a saturated poly-alcohol containing at least 3 hydroxyl groups, said polyester containing terminal- and chain-positioned hydroxyl groups.

5. A coating composition for use in insulating electric conductors as defined in claim 4, wherein said derivatives of isophthalic and terephthalic acids are selected from the group consisting of the lower alkyl esters and acid chlorides thereof.

6. A coating composition for use in insulating electric conductors as defined in claim 4, wherein said poly-alcohol having at least 3 hydroxyl groups in said polyester B is glycerine.

7. A coating composition for use in insulating electric conductors as defined in claim 4, further including a hardening agent selected from the group consisting of the organic titanates, said hardening agent being used in quantities of from 0.5 to 8% by weight based on the weight of the solid constituents of the composition.

8. An insulated electric conductor consisting of an electrically conductive material coated with an insulating composition comprising (A) approximately 5 to 60 parts by weight of a linear hydroxypolyester of an acid selected from the group consisting of terephthalic acid and mixtures thereof with isophthalic acid and ethylene glycol, said linear hydroxypolyester having a viscosity number above about 0.5, and (B) approximately 95 to 40 parts by weight of a polyester of a compound selected from the group consisting of terephthalic acid, isophthalic acid, mixtures of terephthalic and isophthalic acids, and derivatives of isophthalic and terephthalic acids having a radical disposed on at least one of the cabonyl groups which is easily replaceable by the alkoxy group of an alcohol, ethylene glycol and a saturated poly-alcohol containing at least 3 hydroxyl groups, said polyester containing terminal- and chain-positioned hydroxyl groups.

9. An insulated electric conductor as defined in claim 8, wherein said conductive material is copper wire.

10. An insulating composition for use in electrically insulated conductors comprising (A) approximately 5 to 60 parts by weight of a linear hydroxypolyester of an acid mixture containing between approximately 100 and 40 parts by weight of terephthalic acid and between approximately 0 and 60 parts by weight of isophthalic acid and ethylene glycol, said linear hydroxypolyester having a viscosity number above about 0.5, (B) approximately 95 to 40 parts by weight of a polyester of terephthalic acid, ethylene glycol and glycerine, containing terminal- and chain-positioned hydroxyl groups, and (C) an organic solvent.

11. A coating composition for use in insulating electric conductors comprising (A) approximately 5 to 60 parts by weight of a linear hydroxypolyester of an acid mixture containing between approximately 100 to 40 parts by weight of terephthalic acid and 0 to 60 parts by weight of isophthalic acid and ethylene glycol, said linear hydroxypolyester having a viscosity number above about 0.5, (B) approximately 95 to 40 parts by weight of a polyester of a compound selected from the group consisting of terephthalic acid, isophthalic acid, mixtures of terepthalic and isophthalic acids, and derivatives of isophthalic and terephthalic acids having a radical disposed on at least one of the carbonyl groups which is easily replaceable by the alkoxy group of an alcohol, ethylene glycol and a saturated poly-alcohol containing at least 3 hydroxyl groups, said polyester containing terminal- and chain-positioned hydroxy groups and (C) an organic solvent.

12. A coating composition for use in insulating electric conductors comprising (A) approximately 5 to 60 parts by weight of a linear hydroxypolyester of an acid selected from the group consisting of terephthalic acid and mixtures thereof with isophthalic acid and ethylene glycol, said linear hydroxypolyester having a viscosity number above about 0.5, (B) approximately 95 to 40 parts by weight of a polyester containing terminal- and chain-positioned hydroxyl groups, said polyester being a polyester of a reaction mixture containing approximately 1 to 2.44 mol of terephthalic acid, 0.6 to 1.84 mol of ethylene glycol, and 0.3466 to 1.1733 mol of a saturated, aliphatic, polyhydric alcohol having at least 3 hydroxyl groups, and (C) an organic solvent.

13. A coating composition for use in insulating electric conductors comprising (A) approximately 5 to 60 parts by weight of a linear hydroxypolyester of an acid selected from the group consisting of terephthalic acid and mixtures thereof with isophthalic acid and ethylene glycol, said linear hydroxypolyester having a viscosity number above about 0.5, (B) approximately 95 to 40 parts by weight of a polyester containing terminal- and chain-positioned hydroxyl groups from a mixture of isophthalic and terephthalic acids, said mixture containing between approximately 100 to 50 parts by weight of terephthalic acid and between 50 to 100 parts by weight of isophthalic acid, ethylene glycol and a saturated poly-alcohol containing at least 3 hydroxyl groups, and (C) an organic solvent.

14. A coating composition for use in insulating conductors comprising (A) approximately 5 to 60 parts by weight of a linear hydroxypolyester of an acid selected from the group consisting of terephthalic acid and mixtures thereof with isophthalic acid and ethylene glycol, said linear hydroxypolyester having a viscosity number above about 0.5, (B) approximately 95 to 40 parts by weight of a polyester containing terminal- and chain-positioned hydroxyl groups, said polyester being a polyester of a reaction mixture comprising a compound selected from the group consisting of terephthalic acid, isophthalic acid, mixtures of terephthalic and isophthalic acids, and derivatives of isophthalic and terephthalic acids having a radical disposed on at least one of the carbonyl groups which is easily replaceable by the alkoxy group of an alcohol, ethylene glycol and a saturated poly-alcohol containing at least 3 hydroxyl groups, (C) an organic solvent, and (D) a hardener consisting of between approximately 1 and 2% by weight of tetrabutyl titanate, based on the weight of the solid constituents of the composition.

15. A method of manufacturing electrically insulated conductors by coating the same with an insulating composition, comprising passing the electric conductor through a bath of a coating composition comprising (A) approximately 5 to 60 parts by weight of a linear hydroxypolyester of an acid selected from the group consisting of terepthalic acid and mixtures thereof with isophthalic acid and ethylene glycol, said linear hydroxypolyester having a viscosity number above about 0.5, and (B) approximately 95 to 40 parts by weight of a polyester of a compound selected from the group consisting of terephthalic acid, isophthalic acid, mixtures of terephthalic and isophthalic acids, and derivatives of isophthalic and terephthalic acids having a radical disposed on at least one of the carbonyl groups which is easily replaceable by the alkoxy group of an alcohol, ethylene glycol and a saturated poly-alcohol containing at least 3 hydroxyl groups, said polyester containing terminal- and chain-positioned hydroxyl groups.

16. A method of manufacturing electrically insulated conductors as defined in claim 15, wherein said coating composition includes an organic solvent.

17. A method of manufacturing electrically insulated conductors as defined in claim 16, wherein said conductor is copper wire.

References Cited by the Examiner

UNITED STATES PATENTS

| | | | |
|---|---|---|---|
| 2,917,414 | 12/1959 | McLean | 260—75 |
| 2,936,296 | 5/1960 | Precopio et al. | 260—75 |
| 3,122,451 | 2/1964 | Bung et al. | 260—75 |

FOREIGN PATENTS 599,097  3/1948  Great Britain.

MURRAY TILLMAN, *Primary Examiner.*

J. T. GOOLKASIAN, *Assistant Examiner.*